United States Patent [19]

Hilfman

[11] 3,884,798

[45] May 20, 1975

[54] HYDROCRACKING PROCESS USING CO-EXTRUDED NICKEL-ON-SILICA-ALUMINA

[75] Inventor: Lee Hilfman, Mount Prospect, Ill.

[73] Assignee: Universal Oil Products Company, Des Plaines, Ill.

[22] Filed: Mar. 12, 1973

[21] Appl. No.: 340,423

Related U.S. Application Data

[62] Division of Ser. No. 228,825, Feb. 24, 1972, abandoned.

[52] U.S. Cl. ............... 208/111; 208/135; 252/435; 252/439; 252/455 R; 252/456
[51] Int. Cl. ...................... C10g 13/06; C10g 31/14
[58] Field of Search ............................ 208/111, 112

[56] References Cited
UNITED STATES PATENTS

| | | | |
|---|---|---|---|
| 3,399,132 | 8/1968 | Mulaskey | 208/111 |
| 3,471,397 | 10/1969 | Fortman | 208/111 |
| 3,493,517 | 2/1970 | Jaffe | 252/437 |
| 3,535,232 | 10/1970 | Lawrance et al. | 208/111 |
| 3,617,527 | 11/1971 | Hilfman | 208/216 |
| 3,673,079 | 6/1972 | Mulaskey et al. | 208/111 |
| 3,692,858 | 9/1972 | Brewer et al. | 260/672 |
| 3,783,123 | 1/1974 | Young | 208/111 |
| 3,824,180 | 7/1974 | Hilfman | 208/111 |
| 3,825,504 | 7/1974 | Hilfman | 252/455 |
| 3,825,505 | 7/1974 | Hilfman | 252/455 |

Primary Examiner—Delbert E. Gantz
Assistant Examiner—G. E. Schmitkons
Attorney, Agent, or Firm—James R. Hoatson, Jr.; Thomas K. McBride; William H. Page, II

[57] ABSTRACT

A process for hydrocracking a hydrocarbonaceous charge stock using a catalytic composite of an alumina-containing, porous carrier material and a nickel component. The composite is prepared via coextrusion, and contains from about 6.5 to about 10.5% by weight of nickel, calculated as the element, within which range maximum hydrocracking activity and stability are attained.

3 Claims, 1 Drawing Figure

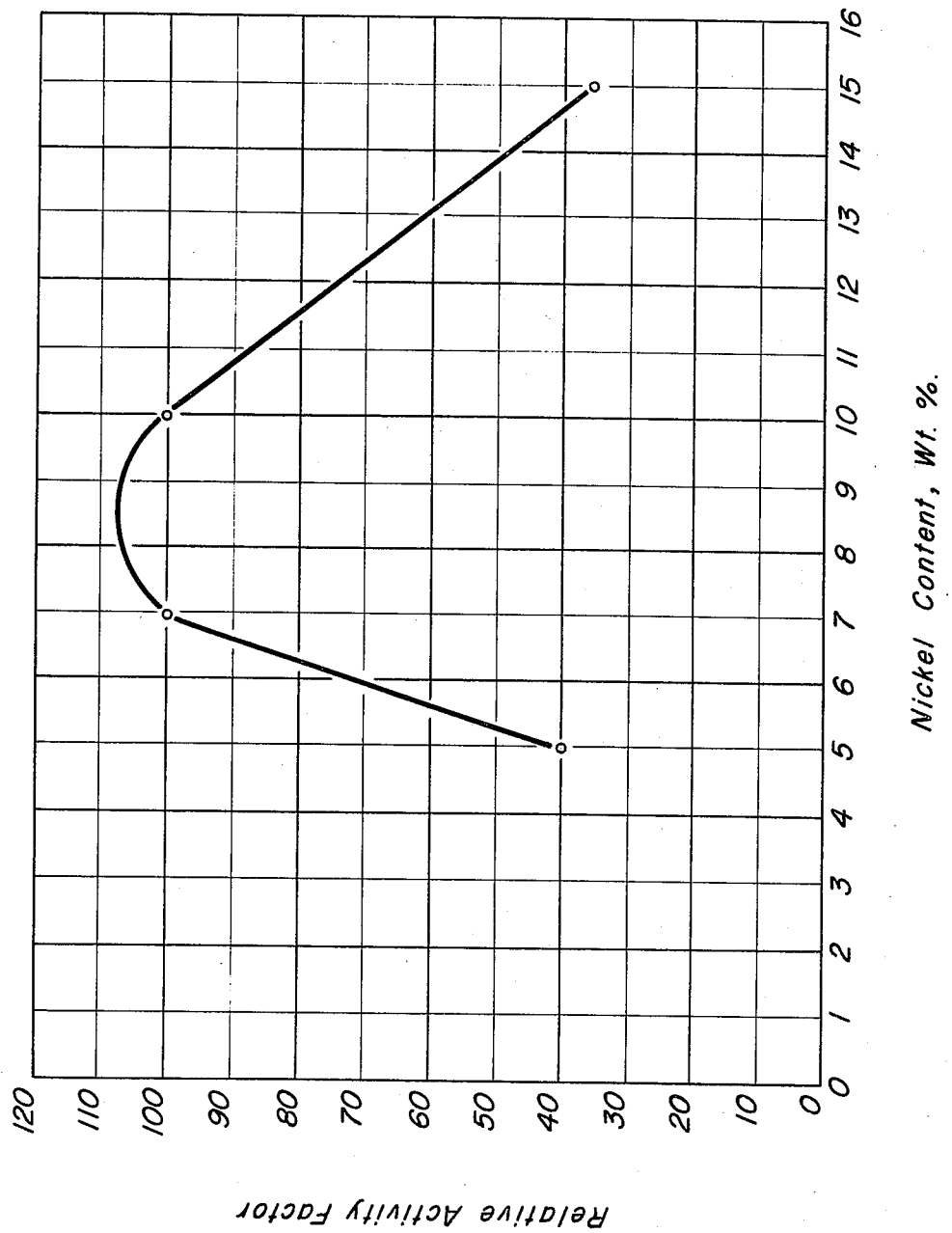

HYDROCRACKING PROCESS USING CO-EXTRUDED NICKEL-ON-SILICA-ALUMINA

CROSS-REFERENCES TO RELATED APPLICATIONS

This application is a division of my copending application Ser. No. 228,825 filed Feb. 24, 1972, and now abandoned.

APPLICABILITY OF INVENTION

Hydrocracking connotes one of the many hydroprocesses employed for the conversion of hydrocarbonaceous material wherein the chemical consumption of hydrogen occurs. In addition to hydrocracking, principal among the hydroprocesses is hydrotreating, or hydrorefining, wherein a hydrocarbonaceous feed stock is "cleaned up" for the purpose of preparing a product suitable for utilization as the charge to a subsequent conversion process. While generally applicable for utilization in various hydroprocesses, the catalyst of the present invention is specifically intended for use in a hydrocracking process. When so utilized, the coextruded, nickel-containing catalyst exhibits an unusual degree of hydrocracking activity and stability, the latter being the capability to function acceptably for an extended period of time. Thus, the present invention can be utilized to achieve the maximum production of LPG (liquefied petroleum gas) in the propane/butane range from naphtha, or gasoline boiling range distillates. Heavier charge stocks, including kerosenes, light gas oils, heavy gas oils, full boiling range gas oils and "black oils" may be readily converted into lower-boiling, normally liquid products including gasolines, kerosenes, middle-distillates, lube oils, etc.

The catalytic composite which constitutes the essence of the present invention can be categorized as a dual-function catalyst; that is, it possesses both hydrocracking and hydrogenation activity. Successful dual-function catalysts are those which exhibit the capability to perform specified functions initially and have the propensity to perform in a satisfactory manner for prolonged periods of time. As employed in the petroleum refining art, the analytical terms measuring the degree to which a particular dual-function catalyst performs are activity, selectivity and stability. With respect to hydrocracking, the activity, stability and selectivity, as utilized herein, may be defined as follows: "activity" refers to the quantity of the charge stock, boiling above a given temperature which is converted to hydrocarbons boiling below the given temperature; "selectivity" connotes the quantity of converted charge stock which boils below the desired end point of the product, and above a minimum specified initial boiling point; and, "stability" refes to the rate of change of activity and selectivity. Where a gas oil, for example, boiling above a temperature of about 650°F., is subjected to hydrocracking, "activity" indicates the conversion of 650°F.-plus charge stock into 650°F.-minus product. "Selectivity" might allude to the degree of conversion into gasoline boiling range hydrocarbons—i.e., heptanes and heavier normally liquid hydrocarbons boiling up to a temperature of about 400°F. "Stability" may be conveniently expressed in terms of the temperature increase during various increments of catalyst life, to maintain the desired activity and selectivity; this is conveniently expressed in terms of "degrees per barrel of charge stock per pound of catalyst" (disposed within the reaction zone).

OBJECTS AND EMBODIMENTS

A principal object of the present invention is to provide a catalytic composite for utilization in the conversion of hydrocarbonaceous material. A corollary objective is to provide an improved process for hydrocracking a hydrocarbon feed stock, which process is effected through the utilization of a coextruded catalytic composite of an alumina-containing carrier material and from about 6.5 to about 10.5% by weight of a nickel component, calculated as the elemental metal.

Another object is to improve the activity and stability of a nickel-containing hydrocracking catalyst.

Therefore, in a broad embodiment, the present invention is directed toward a catalytic composite of co-extruded particles of an alumina-containing, porous carrier material and from about 6.5 to about 10.5% by weight of a nickel component, calculated as the elemental metal.

In a specific embodiment, the hydrocracking conditions include a maximum catalyst bed temperature of about 600°F. to about 900°F., a pressure of about 500 to about 5,000 psig., a liquid hourly space velocity of about 0.1 to about 10.0 and a hydrogen concentration in the range of about 1,000 to about 50,000 scf./Bbl.

In another specific embodiment, the catalytic composite is calcined, in an atmosphere of air, at a temperature above 1200°F., prior to contact with the fresh feed charge stock.

Other objects and embodiments of my invention relate to additional details regarding the preferred catalytic ingredients, the concentration of components within the catalytic composite, the method of catalyst preparation, preferred processing techniques and similar particulars which are hereinafter set forth in the following, more detailed summary of my invention.

SUMMARY OF INVENTION

Catalytic composites, tailored for the conversion of hydrocarbonaceous material and particularly those intended for utilization in a hydrocracking process, have traditionally consisted of metallic elements chosen from Group VIII of the Periodic Table; quite often, metallic components from Group VI-B are incorporated therein. In those instances where hydrocracking is intended to be accompanied by some hydrorefining (desulfurization, denitrification, etc.) the preferred metallic components have been nickel and molybdenum, and nickel and tungsten, which components are usually combined with a porous carrier material comprising both alumina and silica, either amorphous or zeolitic in nature. Ample evidence may be found in the literature which confirms the ability of the nickel component to effect both cracking and hydrogenation reactions. Furthermore, the prior art indicates a preference for two particular methods of catalyst preparation. Predominantly preferred is an impregnating procedure wherein a previously calcined, preformed carrier material, generally in the form of spheres or pills, is contacted with suitable soluble compounds of the nickel component and the Group VI-B component, where the latter is utilized. Impregnation involves both subsequent drying at a temperature of about 300°F., and calcination at a temperature of about 1100°F. The second preferred preparation scheme involves coprecipitating all the catalyst components, including those of the carrier material. For example, an aqueous solution of aluminum chloride, sodium silicate and nickel chloride is formed and subsequently coprecipitated through the addition of a basic medium such as ammonium hydroxide. While speculatively teaching that the final catalytic composite may take the form of extrudates, the prior art quite clearly indicates an overwhelming preference for spheres and/or pills which are either impregnated with the active metallic components, or coprecipitated therewith. The reluctance of the prior art to produce alumina-containing, nickel hydrocracking catalysts in the form of extrudates stems from a decline in stability, as well as a lesser initial activity, compared to a catalyst prepared by impregnation of the nickel component. The poor results appear to be inherent in the catalyst manufacturing method. Extrudates are generally prepared by a technique which involves coprecipitating the carrier material with a nickel component in sufficient quantity to provide a final catalyst containing from about 1.0 to about 20.0% by weight of nickel. Following filtering and low temperature drying, the precipitate is rehydrated to a proper consistency for extrusion. The extrudates are then subjected to drying and high-temperature calcination, during which the nickel component reacts with the alumina to form nickel aluminate, the presence of which destroys the desired activity of the catalyst. I have found that the adverse effect of nickel aluminate can be effectively neutralized when the nickel content of the final catalytic composite is maintained within the critical range of about 6.5 to about 10.5% by weight, calculated as elemental nickel. Thus, it is now possible to prepare a very active and stable hydrocracking catalyst in the form of extrudates. This is accomplished by coextruding a preformed alumina-containing carrier material with the nickel component. As is customary in the art of catalysis, the utilization herein of the term "component", when referring to the catalytically active metal, or metals, is intended to encompass the existence of such metal in the elemental state or in some form such as an oxide, sulfide, halide, etc. Regardless of the state in which the metallic components actually exist, the concentrations are computed as if they existed in the elemental state.

Other advantages attendant the preparation of catalyst in the form of extrudates include the attractive economics resulting from the more simple and faster catalyst preparation technique. It will be immediately recognized by those possessing expertise in the art of catalyst manufacturing schemes, that coextrusion eliminates several tedious steps involved, for example, in an impregnation technique. Equipment of larger capacity is made possible, leading to greater catalyst production in a shorter period of time. One principal advantage resides in the production of catalyst particles, coextrudates, having pore diameters in the desired range of about 100 to about 300 Angstroms. Control of the pore diameter, or size, is readily regulated by the pressure imposed during the initial formation of the extrudates. Respecting spheres and/or pills, control of pore diameter is available only through precise and tedious monitoring of the apparent bulk density. Distinct processing advantages arise as a result of the fact that the coextruded catalyst of the present invention appears to have the ability to regain its stability following regeneration after an extended period of operation.

In a preferred embodiment, which further enhances the activity and stability of the coextruded catalyst, use is made of an additional metallic component. These are selected from the group consisting of iron, tin, phosphorus, zinc, the Group V-B metals, as well as compounds thereof. Where utilized, the same will be present within the final catalytic composite in an amount in the range of about 0.01 to about 5.0% by weight, calculated as the elemental metals. Where such additional metals are utilized, the formation of nickel aluminate is inhibited to a degree such that the final catalytic composite contains less than about 0.1% by weight thereof.

As hereinbefore set forth, the prior art methods of extrusion involve coprecipitation of all the catalytic components including the carrier material. In accordance with the present invention, the porous carrier material is preformed prior to coextrusion with the catalytically active metallic components. It is preferred that the porous carrier material be an adsorptive, high-surface area support. Therefore, suitable carrier materials are selected from the group of amorphous refractory inorganic oxides including alumina, titania, and zirconia, silica, chromia, magnesia, boria, hafnia, and mixtures of two or more, including alumina-zirconia, silica-alumina, alumina-silica-boron phosphate, etc. When of the amorphous refractory inorganic oxide type, a preferred carrier material constitutes a coprecipitated composite of alumina and silica, with the latter being present in an amount from about 10.0 to about 90.0% by weight. In many applications of the present invention, the carrier material will consist of a crystalline aluminosilicate. This may be naturally-occurring, or synthetically-prepared, and includes mordenite, faujasite, Type A or Type U molecular sieves, etc. The porous carrier material may be a mixture of amorphous and zeolitic materials, wherein the latter is dispersed within the amorphous matrix. It is understood that the preparation of the catalyst of the present invention does not involve coprecipitation of the active metallic components with the components of the carrier material. The latter is preformed prior to any contact with the nickel component or the additional metallic components described above. Following the formation of the coextruded extrudates, the composite will generally be dried at a temperature in the range of about 200° to about 600°F., for a period of from 2 to about 24 hours, and subsequently calcined in an atmosphere of air. As hereinafter indicated in a specific example, more active and stable catalysts are prepared when the calcination temperature exceeds about 1200°F., having an upper limit for practical purposes of about 1400°F. The calcination is effected for a period of about 0.5 to about 10 hours.

The initial step in the catalyst preparation method involves commingling the preformed carrier material, for example, a composite of 63.0% by weight of alumina and 37.0% by weight of silica, with a suitable soluble nickel salt. Such nickel salts include nickel nitrate hexahydrate, nickel chloride, nickel bromide, etc. When a Group V-B metal component is utilized, and reference is herein made to the *Periodic Table of The Elements*, E. H. Sargent & Co., 1964, suitable salts include vanadium dichloride, vanadium trichloride, vanadium tetrachloride, vanadyl dichloride, tantalum bromide, niobium oxybromide, niobium oxychloride, and tantalum fluoride, etc. When the additional metal component is phosphorus, a preferred method of catalyst preparation involves the utilization of a phosphoric acid solution of a suitable nickel salt, and particularly nickel nitrate hexahydrate. Suitable tin salts include the halides of tin, and particularly stannic chloride, stannous chloride, stannic bromide, and stannous bromide. Suitable zinc and iron salts include zinc acetate, zinc bromide, zinc chloride, zinc sulfate, zinc nitrate hexahydrate, zinc nitrate trihydrate, zinc sulfate, iron chloride, iron bromide, iron formate, iron acetate, iron nitrate, iron fluoride, etc. When utilized, the additional metallic component will be present in the final catalyst in an amount within the range of about 0.01 to about 5.0% by weight, calculated as if existing in the elemental state.

The preformed carrier material and selected salts of the foregoing metals are ground to a talc-like powder, about 20 to 100 mesh, and preferably from about 30 to about 50 mesh, and intimately admixed with a relatively minor quantity of a suitable acid such as hydrochloric acid, nitric acid, etc. A preferred technique involves mulling the acidic mixture which is subsequently aged for a period of about 15 minutes to about 20 hours. Where a degree of desulfurization is desired, the Group VI-B metal component, in a concentration of about 4.0 to about 30.0% by weight, is added at this stage through the use of a suitable compound such as ammonium molybdate, tungstic acid, molybdic acid, ammonium tungstate, etc. The mixture is once again subjected to mulling and a quiescent age for a period of about 15 minutes to about 2 hours. The resulting plastic-type mass is extruded under a suitable pressure in the range of about 1,000 to about 10,000 psig., to form extrudates of the desired size—e.g., 1/16-inch by 1/16-inch (approximate measurements). After drying and calcining in the manner hereinbefore set forth, the composite is subjected to prereduction and presulfiding. Where an additional component from the group of iron, tin, phosphorous, zinc and the Group V-B metals is utilized, the composite is found to contain less than about 0.1% by weight of nickel aluminate.

Prereduction of the calcined catalytic composite is effected in a water-free atmosphere utilizing substantially pure and dry hydrogen (less than about 30.0 volume ppm. of water). Reduction is effected at a temperature of about 800°F. to about 1200°F. for a period of about 0.5 to about 10 hours. The reduced composite is subjected to presulfiding for the purpose of incorporating therein from about 0.05 to about 0.5% by weight of sulfur, on an elemental basis. This presulfiding treatment is effected in the presence of hydrogen and a suitable sulfur-containing compound such as hydrogen sulfide, low molecular weight mercaptans, various organic sulfides, carbon disulfide, etc. The preferred technique involves treating the reduced catalyst with a sulfiding gaseous medium such as a mixture of hydrogen and hydrogen sulfide at conditions selected to effect the desired incorporation of sulfur. It is generally considered a good practice to perform the presulfiding technique under substantially water-free conditions.

Although not essential to successful hydrocracking, it is often advisable to incorporate a halogen component into the catalytic composite to further enhance the hydrocracking propensity thereof. Although the precise form of the chemistry of association of the halogen component with the carrier material and metallic components is not accurately known, it is customary in the art to refer to the halogen component as being combined with one or more of the other ingredients of the catalyst. The halogen may be selected from the group of fluorine, chlorine, iodine, bromine, and mixtures thereof, with fluorine and chlorine being particularly preferred. The quantity of halogen is such that the final catalytic composite contains about 0.1 to about 3.5% by weight, and preferably from about 0.5 to about 1.5% by weight, calculated on the basis of the elemental halogen.

In accordance with my invention, the hydrocarbon charge stock and hydrogen are contacted with a catalyst of the type described above in one or more hydrocarbon conversion zones. The contacting may be accomplished by using the catalyst in a fixed-bed system, a moving-bed system, a fluidized-bed system or in a batch-type operation. In view of the risk of attrition loss of the catalyst, and further in view of the technical advantages attendant thereto, it is particularly preferred to utilize the fixed-bed system. In this type of system, a hydrogen-rich vaporous phase and the charge stock are preheated by any suitable heating means to the desired initial reaction temperature, the mixture being passed into the conversion zone utilizing the fixed-bed of the catalytic composite. It is understood that the hydrocarbon conversion zone may consist of one or more separate reactors having suitable means therebetween to insure that the desired conversion temperature is maintained at the inlet to one or more catalyst beds. The reactants may be contacted with the catalyst in either upward, downward, or radial flow fashion, with a downward/radial flow system being preferred. Hydrocracking reactions are exothermic in nature, and an increasing temperature gradient will be experienced as the hydrogen and charge stock traverse the catalyst bed. It is desirable to maintain the maximum catalyst bed temperature below about 900°F., which temperature is virtually identical to that which may be conveniently measured at the outlet of the reaction zone. In order to insure that the catalyst bed temperature does not exceed the maximum allowed, conventional quench streams, either normally liquid or normally gaseous, and introduced at one or more intermediate loci of the catalyst bed, may be utilized. When hydrocracking hydrocarbonaceous charge stocks, the desired product is generally characterized by its end boiling point. That portion of the normally liquid effluent boiling above the end boiling point of the desired product will generally be recycled to combine with the charge stock. When this technique is utilized, the combined liquid feed ratio (defined as volumes of total liquid charge to the reaction zone per volume of fresh liquid charge to the reaction zone) will be within the range of about 1.1 to about 6.0.

DESCRIPTION OF DRAWING

The data presented in the accompanying drawing were obtained as hereinafter set forth in a specific example. As indicated, the nickel content of the catalyst, expressed as weight percent, is correlated with the relative activity factor hereinafter described. The selected standard relative activity factor is 100, and is based upon the results obtained with a hydrocracking catalyst of a pilled amorphous refractory inorganic oxide consisting of 75.0% by weight of silica and 25.0% by weight of alumina. The catalytically active metallic component is nickel, in an amount of about 5.0% by weight, incorporated into the carrier by way of an impregnation technique utilizing nickel nitrate hexahydrate. The criticality of the nickel content of the coextruded particles of the present invention is clearly indicated by the "hairpin" type curve. In order to achieve a relative activity factor at least as good as the standard catalyst, the nickel content is seen to exceed 6.5% by weight, but be less than about 10.5% by weight. At these nickel concentrations, the relative activity factors approximate 85 and 93 respectively.

ILLUSTRATIVE EXAMPLES

EXAMPLE I

The data obtained as herein described was utilized in the preparation of the accompanying drawing.

The standard relative activity test procedure is conducted by processing a hydrocarbon fraction at 1500 psig., a maximum catalyst bed temperature of about 600°F. and in the presence of about 3000 scf./Bbl. of hydrogen. The charge stock is a contaminant-free heavy gas oil having a gravity of about 28.6° API, an initial boiling point of 690°F. and an end boiling point of 875°F.; the charge stock contains less than 0.1 ppm. of nitrogen, and indicates "nil" upon analysis for sulphur. For each catalyst, three test periods of approximately 8-hours duration are effected at liquid hourly space velocities which vary from about 1.0 to about 4.0. The normally liquid product effluent from each of the test periods is subjected to distillation to determine the quantity of hydrocarbons boiling below a temperature of 650°F., and these three percentages are plotted against the space velocities employed. The relative activity is determined by the ratio of the liquid hourly space velocity required to produce a product effluent of which 60.0% by volume is distillable at a temperature of 650°F., and comparing this liquid hourly space velocity with that of the standard catalyst. With respect to any given test catalyst, a relative activity coefficient or factor greater than 100 indicates a catalyst having a greater degree of hydrocracking activity than the standard reference catalyst. In order to avoid a temperature run-away due to the exothermicity of the reactions being effected, and to insure that the catalysts remained sulfided during the test procedure, 600 ppm. of sulfur, in the form of ditertbutyl disulfide, was introduced with the charge stock in all instances.

To demonstrate the effect of metals content on hydrocracking activity, a series of coextruded catalysts were prepared by coextruding the proper amount of nickel nitrate hexahydrate with a 75/25 silica-alumina powder, water and extrusion aids into 1/16-inch by 1/16-inch extrudates containing 5.0% nickel, 7.0% nickel, 10.0% nickel and 15.0% nickel. The catalysts were finished by drying and subsequent calcination at 1300°F., followed by a prereduction and presulfiding technique. Each catalyst was tested in the manner hereinabove set forth, and the results compared to an impregnated catalyst containing about 5.0% by weight of nickel composited with a carrier of 75.0% by weight of silica and 25.0% by weight of alumina. The results are tabulated in the following Table I:

TABLE I

| Catalyst | Relative Activity Test Data R.A.F.* |
|---|---|
| Standard, 5.0% Nickel | 100 |

TABLE I-Continued

| Catalyst | Relative Activity Test Data R.A.F.* |
|---|---|
| 5.0% Nickel, Coextruded | 40 |
| 7.0% Nickel, Coextruded | 99 |
| 10.0% Nickel, Coextruded | 100 |
| 15.0% Nickel, Coextruded | 36 |

*Relative Activity Factor

EXAMPLE II

The charge stock employed in this example was the product resulting from the decontamination of a light vacuum gas oil. The charge stock had a gravity of 39.6°API and contains 0.4 ppm. by weight of nitrogen and about 16 ppm. by weight of sulfur. The charge stock had an initial boiling point of 268°F., a 10.0% volumetric distillation temperature of 398°F., a 50.0% distillation temperature of 479°F. and an end boiling point of about 607°F. Processing conditions included a pressure of about 1500 psig., a liquid hourly space velocity of 4.0, a hydrogen concentration of 12,000 scf./Bbl. and a maximum catalyst bed temperature of about 572°F. Under these conditions, the conversion to pentane-400°F. normally liquid material was the criteria employed to determine hydrocracking activity. Each of the catalysts was calcined for 1 hour at a temperature of 1300°F., and then subjected to prereduction and presulfiding with an admixture of hydrogen and hydrogen sulfide for a period of two hours at a temperature of 775°F. The results are indicated in the following Table II:

TABLE II

| Catalyst | Gas Oil Hydrocracking Activity Pentane-400°F.,Vol.% |
|---|---|
| Standard | 48.1 |
| 5.0% Nickel, Coextruded | 50.0 |
| 10.0% Nickel, Coextruded | 64.0 |
| 15.0% Nickel, Coextruded | 28.0 |

The indicated results clearly confirm the standard relative activity test data obtained in Example I.

EXAMPLE III

Two catalysts were prepared, each of which contained 5.0% by weight of nickel, and each of which were reduced and sulfided for about 2 hours at a temperature of 775°F. Both catalysts were prepared by the extrusion method in accordance with the present invention, one was calcined for a 1-hour period at 1100°F., while the second was calcined for a 1-hour period at a temperature of 1300°F. The operating conditions were those as previously set forth in Example II; however, the maximum catalyst bed temperature was adjusted to obtain a conversion, to pentane-400°F. product, of 75.0% by volume. The catalyst which was calcined at 1100°F. required a temperature of 626°F., whereas the catalyst calcined at a temperature of 1300°F. required a temperature of 45° lower, or 581°F. The significance of this data resides in the fact that a substantially lower temperature is necessary with the catalyst calcined at 1300°F. in order to produce the same volumetric yield. Furthermore, it is indicative of the fact that the catalyst can operate at the same maximum catalyst bed temperature with a greater throughput of charge stock afforded when calcined at a temperature of 1300°F.

EXAMPLE IV

This example is presented to illustrate the particular benefits afforded the coextruded catalyst to the present invention when the same is subjected to presulfiding and prereduction prior to contact with the hydrocarbonaceous charge stock. In this illustration, the charge stock was a light cycle oil having a gravity of 30.7°API, an initial boiling point of 400°F. and an end boiling point of 646°F. Two coextruded catalysts were prepared in accordance with the method of the present invention, each of which contained 10.0% by weight of nickel. One catalyst was only oxidized at 1300°F., while the second catalyst was oxidized and subsequently prereduced and presulfided. Operation conditions were 1500 psig., a liquid hourly space velocity of 3.5, a maximum catalyst bed temperature of 600°F., and a hydrogen concentration of 6,000 scf./Bbl. The calcined catalyst converted the charge stock into a 40.5 vol.% yield of 400°F.-minus fraction, while the prereduced and presulfided catalyst produced a 53.8 vol.% yield of 400°F.-minus material.

The foregoing clearly demonstrates the method of the present invention and the benefits to be afforded through the utilization thereof.

I claim as my invention:

1. A process for hydrocracking a hydrocarbonaceous charge stock which comprises reacting said charge stock with hydrogen in contact with a catalytic composite of coextruded particles of a carrier material consisting essentially of a silica-alumina amorphous refractory inorganic oxide in which the silica is present in an amount of from about 10.0 to about 90.0% by weight and from about 6.5 to about 10.5% by weight of a nickel component, calculated as the elemental metal, said particles being prepared by coextruding a mulled acidic admixture of a powdered preformed carrier material consisting essentially of a silica-alumina amorphous refractory inorganic oxide and a powdered nickel salt, said coextruded particles being calcined at a temperature above about 1200° F., reduced, and sulfided prior to contact thereof with said hydrocarbonaceous charge stock; said reaction conditions including a maximum catalyst bed temperature of about 600° to about 900° F., a pressure of about 500 psig. to about 5000 psig., a liquid hourly space velocity of about 0.1 hr.$^{-1}$ to about 10 hr.$^{-1}$ and a hydrogen concentration in the range of about 1000 to about 50,000 scf./Bbl.

2. The process of claim 1 further characterized in that said catalytic composite additionally contains a metal component selected from the group consisting of tin, phosphorus, zinc, the Group V-B metals and compounds thereof.

3. The process of claim 1 further characterized in that the silica-alumina amorphous refractory oxide contains 75.0% by weight of silica and 25.0% by weight of alumina.

* * * * *